(12) United States Patent
Chen et al.

(10) Patent No.: US 8,958,639 B2
(45) Date of Patent: *Feb. 17, 2015

(54) METHOD FOR ESTABLISHING EVALUATION STANDARD PARAMETERS AND METHOD FOR EVALUATING THE QUALITY OF A DISPLAY IMAGE

(71) Applicant: Shenzhen China Star Optoelectronics Technology Co., Ltd., Shenzhen, Guangdong (CN)

(72) Inventors: Lixuan Chen, Shenzhen (CN); Chih-tsung Kang, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 128 days.

This patent is subject to a terminal disclaimer.

(21) Appl. No.: 13/812,879

(22) PCT Filed: Jan. 15, 2013

(86) PCT No.: PCT/CN2013/070453
§ 371 (c)(1),
(2) Date: Jan. 29, 2013

(87) PCT Pub. No.: WO2014/107906
PCT Pub. Date: Jul. 17, 2014

(65) Prior Publication Data
US 2014/0198994 A1    Jul. 17, 2014

(51) Int. Cl.
*G06K 9/00* (2006.01)
*G06T 5/50* (2006.01)

(52) U.S. Cl.
CPC ....................................... *G06T 5/50* (2013.01)

USPC .......................................... 382/167; 382/254

(58) Field of Classification Search
None
See application file for complete search history.

(56) References Cited

U.S. PATENT DOCUMENTS

| | | | |
|---|---|---|---|
| 2005/0104908 A1* | 5/2005 | Brown Elliott | 345/694 |
| 2006/0092440 A1* | 5/2006 | Bagai | 358/1.9 |
| 2006/0262147 A1* | 11/2006 | Kimpe et al. | 345/690 |
| 2008/0129732 A1* | 6/2008 | Johnson et al. | 345/424 |
| 2010/0284624 A1* | 11/2010 | Ninassi et al. | 382/224 |
| 2012/0154626 A1* | 6/2012 | Hatakeyama et al. | 348/223.1 |

OTHER PUBLICATIONS

Wang, Zhou, et al. "Image quality assessment: from error visibility to structural similarity." Image Processing, IEEE Transactions on 13.4 (2004): 600-612.*

(Continued)

*Primary Examiner* — Li Liu
(74) *Attorney, Agent, or Firm* — Andrew C. Cheng

(57) ABSTRACT

The present invention discloses a method for establishing evaluation standard parameters and method for evaluating the quality of a display image, wherein, the method comprises: taking pictures to a group of test images having different color shift severity degrees to obtain a sample picture group; selecting a standard picture by human eye; applying the Fourier transform to tristimulus values of all pictures; respectively applying convolution to the frequency distribution function corresponding to each primary color with a contrast sensitivity function of human eye; respectively normalizing to each of the convolution functions; and selecting the evaluation parameters of the three primary colors of the standard picture as the evaluation standard parameters. The present invention can obtain more objective and systemic evaluation standard parameters.

10 Claims, 4 Drawing Sheets

(56) References Cited

OTHER PUBLICATIONS

Huang, Kai-Qi, Qiao Wang, and Zhen-Yang Wu. "Natural color image enhancement and evaluation algorithm based on human visual system." Computer Vision and Image Understanding 103.1 (2006): 52-63.*

Le Callet, Patrick, and Dominique Barba. "A robust quality metric for color image quality assessment." Image Processing, 2003. ICIP 2003. Proceedings. 2003 International Conference on. vol. 1. IEEE, 2003.*

Mannos, James, and David J. Sakrison. "The effects of a visual fidelity criterion of the encoding of images." Information Theory, IEEE Transactions on 20.4 (1974): 525-536.*

Brettel, Hans, Françoise Viénot, and John D. Mollon. "Computerized simulation of color appearance for dichromats." JOSA A 14.10 (1997): 2647-2655.*

Young, Ian T., Jan J. Gerbrands, and Lucas J. Van Vliet. Fundamentals of image processing. Delft, The Netherlands: Delft University of Technology, 1998.*

* cited by examiner

METHOD FOR ESTABLISHING EVALUATION STANDARD PARAMETERS AND METHOD FOR EVALUATING THE QUALITY OF A DISPLAY IMAGE

BACKGROUND OF THE INVENTION

1. Field of the Invention

The present invention relates to the field of image processing, and more particularly relates to a method for establishing evaluation standard parameters and method for evaluating the quality of a display image.

2. Description of Related Art

Display as the friendly interface of human and computer for exchanging information. It is accurate, intuitive, and clear to output information. When selling the display as an electronic product, the quality of a display image becomes one of the important determinants of consumers to buy. The quality of the display image is determined by the brightness, color cast, clarity, and other relevant parameters. Therefore, the evaluation of the quality of the display image is an important content need to be considered in the development and design of the display. Because the information of the display is observed directly by the human eye, its evaluation standards are different for different environments and applications. In recent years, with the rapid increase in the number and diversity of the various display technologies, the quality of the display image is required to be improving.

In the prior art, the evaluation the quality of the image uses JND criteria (Just Noticeable Difference). It requires to use a visual perception experiment based on the psychophysical method to determine a JND critical image, specifically as follows: displaying simultaneously two images in parallel on the monitor each time, wherein one is for an original image and the other is a test image. An observer requires selecting the image that the observer think that the color shifts are obvious in the two images. At first, the color shift difference between the test image and the original image is very large. The observer can easily distinguish the two images. If the selection is correct, it reduces the color shift difference between a next test image and the original image. If the selection is wrong, it increases the color shift difference between a next test image and the original image. Repeat the above process. When the color shift difference meets certain condition, the corresponding test image is the JND critical image. For evaluating a subsequent image, it is the reference base.

However, because the different technical proficiency of the observer, the results of the above evaluations by human eye of the observer maybe different. Even if it is evaluated by the same observer, because of the actual state, the different time, the viewing angle of the display, observed from different light conditions, it leads to that the subjectivity will enter the evaluation resulting in the inconsistency of the evaluation. In addition, the level of awareness of the severity degree of the color shift in the display by the observer will change with different image brightness and ambient light conditions.

As stated above, because the evaluation involves the subjectivity, it is difficult to give an objective and lair evaluation in display design, development and consumer.

SUMMARY OF THE INVENTION

The technical problem solved by the present invention is to provide a method for establishing evaluation standard parameters and method for evaluating the quality of a display image to replace the observation of human eye by the evaluation standard parameters.

In order to solve the above-mentioned technical problem, a technical solution provided by the present invention is: a method for establishing evaluation standard parameters, the evaluation standard parameters for evaluating the quality of a display image, the quality of the image being inversely proportional to the severity degree of the color shift phenomenon of the image, the method comprising:

taking pictures to a group of test images having different color shift severity degrees to obtain a sample picture group, and selecting a standard picture from the sample picture group by human eye; applying the Fourier transform to tristimulus values of pictures of the sample picture group to obtain a frequency distribution function corresponding to each primary color, wherein the frequency distribution function corresponding to each primary color is respectively expressed as;

$$F(\omega_X)=F[X]=\int_{-\infty}^{\infty} Xe^{-i\omega\lambda}d\lambda$$

$$F(\omega_Y)=F[Y]=\int_{-\infty}^{\infty} Ye^{-i\omega\lambda}d\lambda$$

$$F(\omega_Z)=F[Z]=\int_{-\infty}^{\infty} Ze^{-i\omega\lambda}d\lambda$$

$$X=\mu\int_a^b \phi(\lambda)\bar{x}(\lambda)d\lambda$$

$$Y=\mu\int_a^b \phi(\lambda)\bar{y}(\lambda)d\lambda$$

$$Z=\mu\int_a^b \phi(\lambda)\bar{z}(\lambda)d\lambda$$

wherein, $F(\omega_X)$, $F(\omega_Y)$, and $F(\omega_X)$ are respectively the frequency distribution functions corresponding to the red primary color, the green primary colors, and the blue primary color; F is an operator of the Fourier transform; X, Y, and Z, represent the tristimulus values of the red, green, and blue primary colors; $\lambda$ is the wavelength; $\bar{x}(\lambda)$, $\bar{y}(\lambda)$, and $\bar{z}(\lambda)$ are spectral tristimulus values for the standard colorimetric observer; $\phi(\lambda)$ the reflectance of spectrum of a picture; (a, b) for the visible spectral range; $\mu$ is a scale factor; respectively filtering the frequency distribution function corresponding to each primary color to filter the noise; respectively applying convolution to the frequency distribution function corresponding to each primary color with a contrast sensitivity function of human eye in the frequency domain to obtain three convolution functions, the contrast sensitivity function of human eye is expressed as:

$$CSF(\omega)=2.6\times(0.0192+0.114\times\omega)\times e^{(-0.114\times\omega)^{1.1}}$$

the three convolution functions are expressed as:

$$H(\omega_X)=\int_{-\infty}^{\infty} F(\omega_X)CSF(k-\omega)d\omega$$

$$H(\omega_Y)=\int_{-\infty}^{\infty} F(\omega_Y)CSF(k-\omega)d\omega$$

$$H(\omega_Z)=\int_{-\infty}^{\infty} F(\omega_Z)CSF(k-\omega)d\omega$$

$CSF(\omega)$ is the contrast sensitivity function of human eye: $\omega=\sqrt{\omega_X^2+\omega_Y^2}$ is the spatial frequency and it's unit is cycle/degree; $\omega_x$ and $\omega_y$ are the horizontal direction and the vertical direction spatial frequency; $H(\omega_X)$, $H(\omega_Y)$, and $H(\omega_Z)$ are the three convolution functions; k is an offset value; the integral range is $-\infty \square \infty$; respectively normalizing to each of the convolution functions for obtaining a evaluation parameter of each primary color, the evaluation parameter of each primary color is expressed as:

$$Factor_X = \frac{H(\omega_X)}{F(\omega_X)}$$

$$Factor_Y = \frac{H(\omega_Y)}{F(\omega_Y)}$$

$$Factor_Z = \frac{H(\omega_Z)}{F(\omega_Z)}$$

$Factor_X$, $Factor_Y$, and $Factor_Z$ are the evaluation parameters; and selecting the evaluation parameters of the three primary colors of the standard picture from the sample picture group as the evaluation standard parameters.

Wherein, the step of respectively normalizing to each of the convolution function specifically includes: proceeding center translation of an origin of each convolution function, calculating an absolute value of each convolution function at the origin, calculating a sum of the absolute values of the function of all variables of the frequency distribution function corresponding to each convolution function, and calculating the ratio of the absolute value of the function to the sum of the absolute values of the function.

Wherein, before calculating the ratio of the absolute value of the function to the sum of the absolute values of the function, excluding the absolute value of the frequency distribution function at the origin corresponding to each primary color in the sum of the absolute value of the function.

In order to solve the above-mentioned technical problem, another technical solution provided by the present invention is: a method for establishing evaluation standard parameters, the evaluation standard parameters for evaluating the quality of a display image, the quality of the image being inversely proportional to the severity degree of the color shift phenomenon of the image, the method comprising: taking pictures to a group of test images having different color shift severity degrees to obtain a sample picture group, and selecting a standard picture from the sample picture group by human eye; applying the Fourier transform to tristimulus values of pictures of the sample picture group to obtain a frequency distribution function corresponding to each primary color; respectively applying convolution to the frequency distribution function corresponding to each primary color with a contrast sensitivity function of human eye in the frequency domain to obtain three convolution functions respectively normalizing to each of the convolution functions for obtaining a evaluation parameter of each primary color; and selecting the evaluation parameters of the three primary colors of the standard picture from the sample picture group as the evaluation standard parameters.

Wherein, before the step of respectively applying convolution to the frequency distribution function corresponding to each primary color with a contrast sensitivity function of human eye in the frequency domain, respectively filtering the frequency distribution function corresponding to each primary color to filter the noise.

Wherein, the frequency distribution function corresponding to each primary color is respectively expressed as:

$$F(\omega_X)=F[X]=\int_{-\infty}^{\infty} Xe^{-i\omega\lambda}d\lambda$$

$$F(\omega_Y)=F[Y]=\int_{-\infty}^{\infty} Ye^{-i\omega\lambda}d\lambda$$

$$F(\omega_Z)=F[Z]=\int_{-\infty}^{\infty} Ze^{-i\omega\lambda}d\lambda$$

$$X=\mu\int_a^b \phi(\lambda)\bar{x}(\lambda)d\lambda$$

$$Y=\mu\int_a^b \phi(\lambda)\bar{y}(\lambda)d\lambda$$

$$Z=\mu\int_a^b \phi(\lambda)\bar{z}(\lambda)d\lambda$$

$F(\omega_X)$, $F(\omega_Y)$, and $F(\omega_Z)$ are respectively the frequency distribution functions corresponding to the red primary color, the green primary colors, and the blue primary color; F is an operator of the Fourier transform; X, Y, and Z, represent the tristimulus values of the red, green, and blue primary colors; $\lambda$ is the wavelength; $\bar{x}(\lambda)$, $\bar{y}(\lambda)$, and $\bar{z}(\lambda)$ are spectral tristimulus values for the standard colorimetric observer; $\phi(\lambda)$ the reflectance of spectrum of a picture; (a, b) for the visible spectral range; $\mu$ is a scale factor.

Wherein, the contrast sensitivity function of human eye is expressed as:

$$CSF(\omega)=2.6\times(0.0192+0.114\times\omega)\times e^{(-0.114\times\omega)^{1.1}}$$

wherein, $CSF(\omega)$ is the contrast sensitivity function of human eye; $\omega=\sqrt{\omega_x^2+\omega_y^2}$ is the spatial frequency and its unit is cycle/degree; $\omega_x$ and $\omega_y$ are the horizontal direction and the vertical direction spatial frequency.

Wherein, the three convolution functions are expressed as:

$$H(\omega_X)=\int_{-\infty}^{\infty} F(\omega_X)CSF(k-\omega)d\omega$$

$$H(\omega_Y)=\int_{-\infty}^{\infty} F(\omega_Y)CSF(k-\omega)d\omega$$

$$H(\omega_Z)=\int_{-\infty}^{\infty} F(\omega_Z)CSF(k-\omega)d\omega$$

wherein, $H(\omega_X)$, $H(\omega_Y)$, and $H(\omega_Z)$ are the three convolution functions; k is an offset value; the integral range is $-\infty \square \infty$.

Wherein, the step of respectively normalizing to each of the convolution functions specifically includes: proceeding center translation of an origin of each convolution function, calculating an absolute value of each convolution function at the origin, calculating a sum of the absolute values of the function of all variables of the frequency distribution function corresponding to each convolution function, and calculating the ratio of the absolute value of the function to the sum of the absolute values of the function.

Wherein, before calculating the ratio of the absolute value of the function to the sum of the absolute values of the function, excluding the absolute value of the frequency distribution function at the origin corresponding to each primary color in the sum of the absolute value of the function.

Wherein, the evaluation parameter of each primary color is expressed as:

$$Factor_X = \frac{H(\omega_X)}{F(\omega_X)}$$

$$Factor_Y = \frac{H(\omega_Y)}{F(\omega_Y)}$$

$$Factor_Z = \frac{H(\omega_Z)}{F(\omega_Z)}$$

wherein, $Factor_X$, $Factor_Y$, and $Factor_Z$ are the evaluation parameters.

In order to solve the above-mentioned technical problem, another technical solution provided by the present invention is: a method for evaluating the quality of a display image, wherein, the method uses the evaluation standard parameters according to above methods, the method comprising: taking a picture to the display image to obtain a picture; applying the Fourier transform to tristimulus values of the picture to obtain a frequency distribution function corresponding to each primary color; respectively applying convolution to the frequency distribution function corresponding to each primary color with a contrast sensitivity function of human eye in the frequency domain to obtain three convolution function; respectively normalizing to each of the convolution functions for obtaining a evaluation parameter of each primary color; and judging if the evaluation parameter of each primary color is greater than the evaluation standard parameter of corresponding primary color, wherein if one of the evaluation parameter of each primary color is greater than the evaluation standard parameter of the corresponding primary color, determining that the quality of the image is failed.

Wherein, the step of respectively normalizing to each of the convolution functions specifically includes: proceeding center translation of an origin of each convolution function, calculating an absolute value of each convolution function at the origin, calculating a sum of the absolute values of the function of all variables of the frequency distribution function corresponding to each convolution function, and calculating the ratio of the absolute value of the function to the sum of the absolute values of the function.

In summary, the method for establishing evaluation standard parameters and method for evaluating the quality of a display image of the present invention by applying the Fourier transform to tristimulus values of all pictures; respectively applying convolution to the frequency distribution function corresponding to each primary color with a contrast sensitivity function of human eye; respectively normalizing to each of the convolution functions; and selecting the evaluation parameters of the three primary colors of the standard picture as the evaluation standard parameters. The present invention can obtain more objective and systemic evaluation standard parameters to improve the objectivity of the image evaluation and to help the design and the development of the display system.

BRIEF DESCRIPTION OF THE DRAWINGS

In order to more clearly illustrate the technical solution in the present invention or in the prior art, the following will illustrate the figures used for describing the embodiments or the prior art. It is obvious that the following figures are only some embodiments of the present invention. For the skilled persons of ordinary skill in the art without creative effort, it can also obtain other figures according to these figures.

DETAILED DESCRIPTION OF THE PREFERRED EMBODIMENT

The following content combines with the drawings and the embodiment for describing the present invention in detail.

Figure 1:
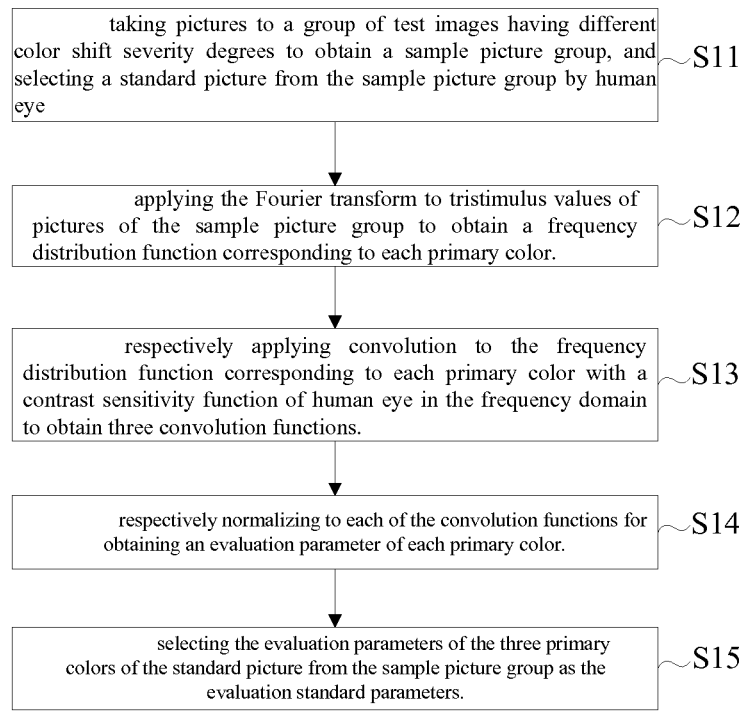
FIG. 1 is a flow chart of a method for establishing evaluation standard parameters according to a first embodiment of the present invention.

With reference to FIG. 1, FIG. 1 is a flow chart of a method for establishing evaluation standard parameters according to a first embodiment of the present invention. The evaluation standard parameters are for evaluating the quality of the display image. In the embodiment of the present invention, the color shift phenomenon of an image can be directly observed by the human eye, and the quality of an image is inversely proportional to the severity degree of the color shift phenomenon of the image. The method comprises the following steps:

Step S11: taking pictures to a group of test images having different color shift severity degrees to obtain a sample picture group, and selecting a standard picture from the sample picture group by human eye.

Wherein the group of test images is pure images and the severity degrees are arbitrarily distributed. In the process of development and design of the display, it obtains the group of test images that distributed arbitrary in severity degrees by artificial design. The present invention does not limit the number of the test images, and the number of the test images may select according to the actual testing requirement.

The group of test images is taken pictures by charge-coupled device (CCD). Each of the test images gets a picture, and after completion of taking pictures, it obtains the sample picture group.

The existing display and coding technology can not make sure that the quality of an image is perfect. There are always unsatisfactory deflects. Because the various technical parameters that affect the quality of the final image exist interaction and the costs to improve the various technical parameters are also different, and the costs are the problems that must be considered in the actual production. Improving the quality of the image in the development and design requires considering various factors of weight and compromise. It is considered that the quality of the image on a display is judging by the consumer through the human eye directly and the human eye has a limited capacity on the severity degree of an image. Some images exist certain of severity degree, but the human eye can not detect so that it can be judged that the quality of the image is acceptable. Therefore, in the present embodiment, it selects a picture as the standard picture by the human eye and the severity degree of the standard picture almost does not affect the quality of the image such that it can be accepted by the human eye.

Step S12: applying the Fourier transform to tristimulus values of pictures of the sample picture group to obtain a frequency distribution function corresponding to each primary color.

Wherein the pure color image of the display has one color, and it requires some quantities of three primary colors (red, green, and blue) for matching the color, the quantities of the three primary colors are the tristimulus values of that color. Therefore, the tristimulus values can represent the color shill degree of a picture. It proceeds the Fourier transform to the tristimulus values is to proceed the Fourier transform to each primary color. Three frequency distribution functions can be obtained from each picture, and each of the three frequency distribution functions corresponds to one of the primary colors, and it can obtain some spectral values from the frequency distribution function.

Step S13: respectively applying convolution to the frequency distribution function corresponding to each primary color with a contrast sensitivity function of human eye in the frequency domain to obtain three convolution functions.

Figure 2:
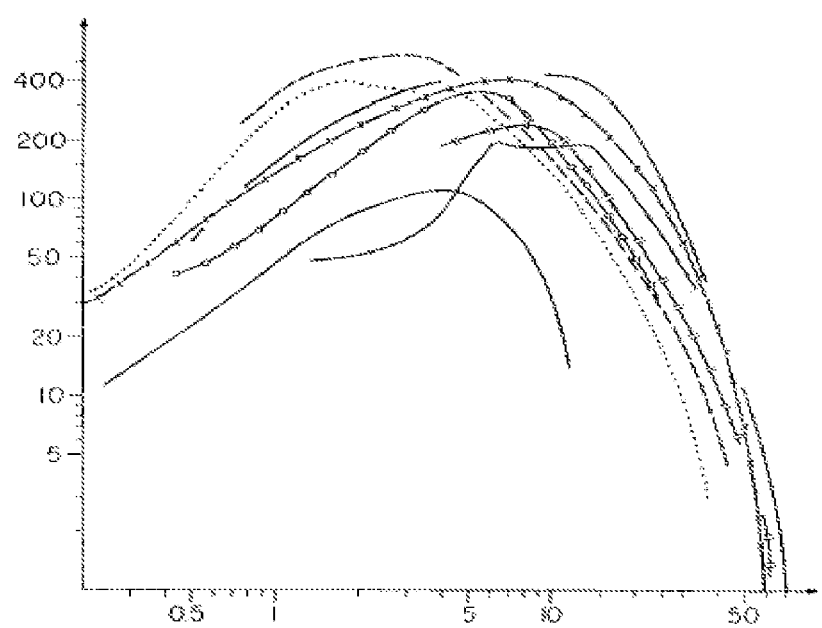
FIG. 2 is a schematic diagram of curves of a contrast sensitivity function of human eye.

Wherein, the contrast sensitivity function (CSF) of human eye is a function that is the reciprocal of the detection contrast threshold (referred to as a visual acuity) changing with the spatial frequency of stimulation. The data of CSF of human eye are obtained by experimental measurements of human visual psychophysics. For example, with reference to FIG. 2, FIG. 2 is a schematic diagram of curves of a contrast sensitivity function of human eye. In FIG. 2, the horizontal axis represents the spatial frequency, and the vertical axis represents the visual acuity. There are some curves in FIG. 2, and they are experience curves obtained after some experiments from the former science and technology workers and closed each other.

After applying convolution to the frequency distribution function corresponding to each primary color with the contrast sensitivity function (CSF) of human eye, it obtains a convolution function. Each spectral value changes correspondingly in the frequency distribution function, that is, re-obtaining a group of spectral values, and these spectral values can be obtained from the convolution function.

Step S14: respectively normalizing to each of the convolution functions for obtaining an evaluation parameter of each primary color.

Wherein, after the normalization, the spectral values corresponding to the three convolution functions becomes dimensionless, and the evaluation parameters represent the relative value of the spectrum values corresponding to convolution functions and the spectral values corresponding to the frequency distribution functions.

Step S15: selecting the evaluation parameters of the three primary colors of the standard picture from the sample picture group as the evaluation standard parameters.

Wherein, after obtaining all of the evaluation parameters, it can directly obtain the difference between the evaluation parameters of the standard picture and other evaluation parameters from the evaluation parameters in order to judge if the selection of the standard picture has the representation and reference.

If it exist larger error at the selection of the reference of the evaluation parameters of the standard picture, it repeats step S11 to re-select a standard picture. Here, since the color shift of an image is determined by its tristimulus values, therefore, the evaluation parameter of each tristimulus values is one of the evaluation standard parameters so that the evaluation standard parameters will be more accurate and systemic.

Comparing to the prior art to select the JND critical image as a standard image, the method for establishing the evaluation standard parameters of the present invention calculates the evaluation parameters of the standard pictures and selects the evaluation parameters as the evaluation standard parameters. The evaluation standard parameters are as an objective evaluation criteria in order to use the evaluation standard parameters to replace the observation of the human eye.

Figure 3:
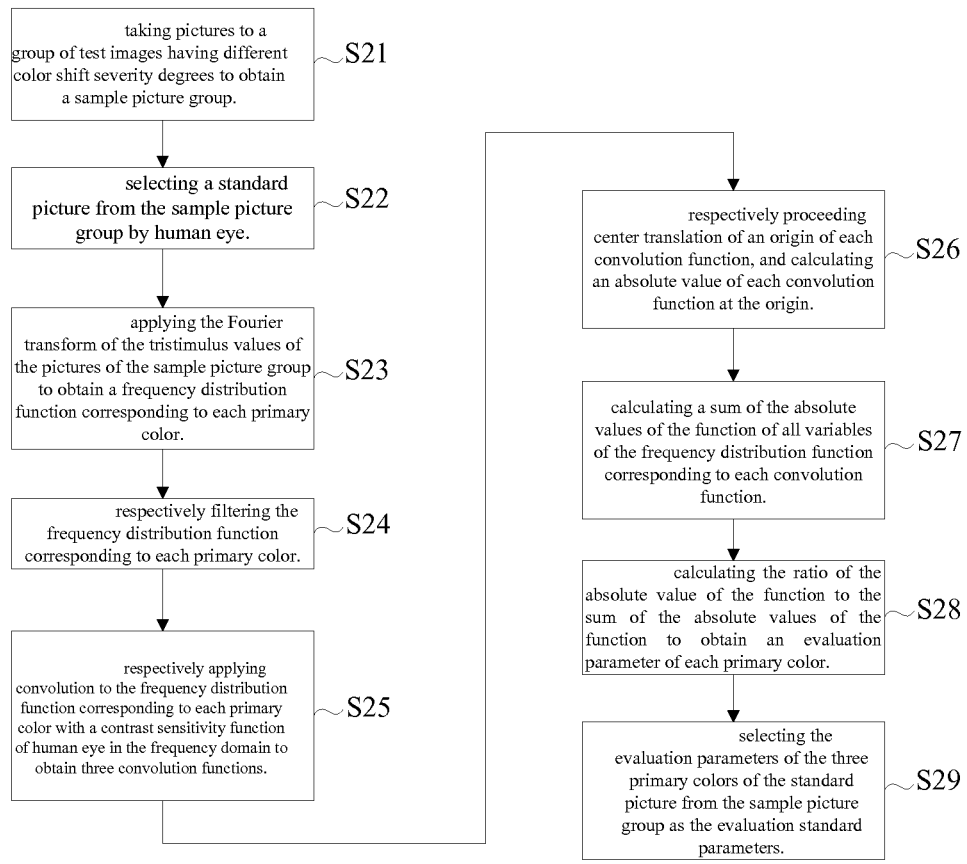
FIG. 3 is a flow chart of a method for establishing evaluation standard parameters according to a second embodiment of the present invention.

With reference to FIG. 3. FIG. 3 is a flow chart of a method for establishing evaluation standard parameters according to a second embodiment of the present invention. The method comprises the following steps:

Step S21: taking pictures to a group of test images having different color shift severity degrees to obtain a sample picture group.

Step S22: selecting a standard picture from the sample picture group by human eye.

Wherein the steps S21 and S22 can refer to the foregoing embodiment, and it does not repeat here.

Step S23: applying the Fourier transform of the tristimulus values of the pictures of the sample picture group to obtain a frequency distribution function corresponding to each primary color.

Wherein, applying the Fourier transform to the tristimulus values of the pictures, and the frequency distribution functions corresponding to each primary color are respectively represented by:

$$F(\omega_X)=F[X]=\int_{-\infty}^{\infty} Xe^{-i\omega\lambda}d\lambda$$

$$F(\omega_Y)=F[Y]=\int_{-\infty}^{\infty} Ye^{-i\omega\lambda}d\lambda$$

$$F(\omega_Z)=F[Z]=\int_{-\infty}^{\infty} Ze^{-i\omega\lambda}d\lambda$$

$$X=\mu\int_a^b \phi(\lambda)\bar{x}(\lambda)d\lambda$$

$$Y=\mu\int_a^b \phi(\lambda)\bar{y}(\lambda)d\lambda$$

$$Z=\mu\int_a^b \phi(\lambda)\bar{z}(\lambda)d\lambda$$

$F(\omega_X)$, $F(\omega_Y)$, and $F(\omega_Z)$ are respectively the frequency distribution functions corresponding to the red primary color, the green primary colors, and the blue primary color; F is an operator of the Fourier transform; X, Y, and Z, represent the tristimulus values of the red, green, and blue primary colors; $\lambda$ is the wavelength; $\bar{x}(\lambda)$, $\bar{y}(\lambda)$, $\bar{z}(\lambda)$ are spectral tristimulus values for the standard colorimetric observer; $\phi(\lambda)$ the reflectance of spectrum of a picture; (a, b) for the visible spectral range; $\mu$ is a scale factor Step S24: respectively filtering the frequency distribution function corresponding to each primary color.

Wherein, the filtering can filter the noise. In the present embodiment, it applies mean filtering to the frequency distribution function corresponding to each primary color.

Step S25: respectively applying convolution to the frequency distribution function corresponding to each primary color with a contrast sensitivity function of human eye in the frequency domain to obtain three convolution functions.

Wherein, since the tristimulus values correspond with their frequency distribution functions, the convolution require for three times. The contrast sensitivity function of human eye is expressed as:

$$CSF(\omega)=2.6\times(0.0192+0.114\times\omega)\times e^{(-0.114\times\omega)^{1.1}}$$

$CSF(\omega)$ is the contrast sensitivity function of human eye; $\omega=\sqrt{\omega_x^2+\omega_y^2}$ is the spatial frequency and it's unit is cycle/degree; $\omega_x$ and $\omega_y$ are the horizontal direction and the vertical direction spatial frequency; The spatial frequency means the number of the periodicity change of the brightness (i.e., gray) in the unit length.

The three convolution functions are expressed as:

$$H(\omega_X)=\int_{-\infty}^{\infty} F(\omega_X)CSF(k-\omega)d\omega$$

$$H(\omega_Y)=\int_{-\infty}^{\infty} F(\omega_Y)CSF(k-\omega)d\omega$$

$$H(\omega_Z)=\int_{-\infty}^{\infty} F(\omega_Z)CSF(k-\omega)d\omega$$

$H(\omega_X)$, $H(\omega_Y)$, and $H(\omega_Z)$ are the three convolution functions; k is an offset value; the integral range is $-\infty\square\infty$.

Step S26; respectively proceeding center translation of an origin of each convolution function, and calculating an absolute value of each convolution function at the origin.

Wherein, the step of proceeding center translation of an origin of each convolution function means translating the center of the convolution function to the origin of the coordinate, that is, translating the spectrum curve corresponding to the convolution function to the origin of the coordinate. At the origin of the coordinate, the absolute value of the spectral value is maximal, and the absolute value of the maximum spectral value is the absolute value of the function.

Step S27: calculating a sum of the absolute values of the function of all variables of the frequency distribution function corresponding to each convolution function.

Wherein, the sum of the absolute values of the function means a sum of the absolute spectral values corresponding to each pixel.

Step S28: calculating the ratio of the absolute value of the function to the sum of the absolute values of the function to obtain an evaluation parameter of each primary color.

Wherein, in the present embodiment, in the calculation, the sum of the absolute values of the function includes the absolute value of the spectral value at the origin. A picture can finally obtain the evaluation parameters of the three primary colors. The evaluation parameter of each primary color is expressed as:

$$Factor_X = \frac{H(\omega_X)}{F(\omega_X)}$$

$$Factor_Y = \frac{H(\omega_Y)}{F(\omega_Y)}$$

$$Factor_Z = \frac{H(\omega_Z)}{F(\omega_Z)}$$

$Factor_X$, $Factor_Y$, and $Factor_Z$ are the evaluation parameters. The evaluation parameters represent the quality of the image. In other embodiments, the sum of the absolute values of the function does not include the absolute value of the spectral value at the origin, that is, the sum of the absolute value of the function at the origin of the frequency distribution function is excluded.

Step S29: selecting the evaluation parameters of the three primary colors of the standard picture from the sample picture group as the evaluation standard parameters.

Wherein, after selecting the evaluation parameters of the standard picture, the evaluation parameters of the X, Y and Z tristimulus values are the three evaluation standard parameters.

Figure 4:
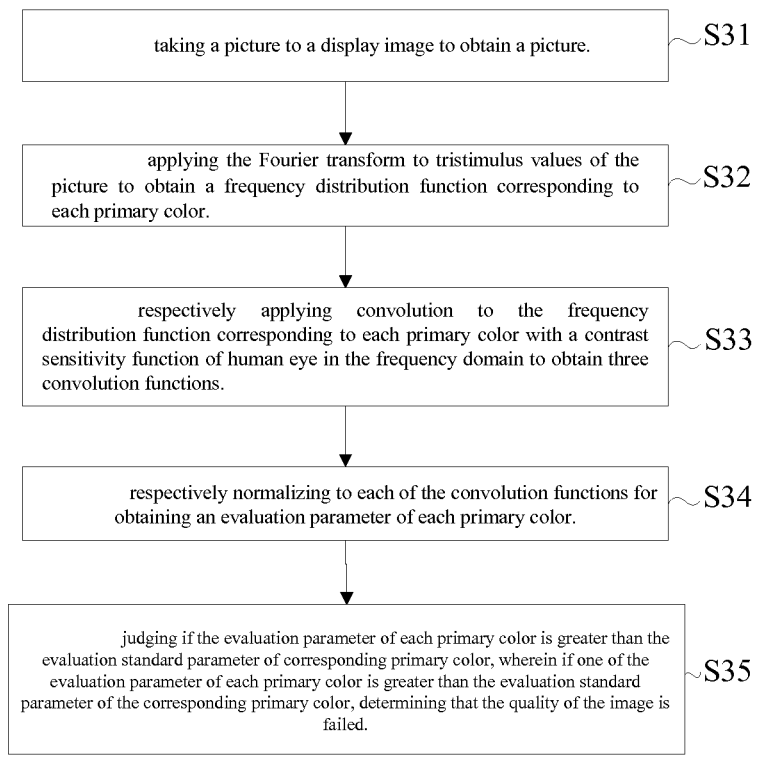
FIG. 4 is a flow chart of a method for evaluating the quality of a display image according to the embodiment of the present invention.

The method for establishing the evaluation standard parameters of the present embodiment change the subjectivity evaluation criteria to become objective evaluation parameters. It is helpful to use the evaluation standard parameters for evaluating an image in the development, design, testing, or production, With reference to FIG. 4, FIG. 4 is a flow chart of a method for evaluating the quality of a display image according to the embodiment of the present invention. The method for evaluating of the present embodiment uses the evaluation standard parameters obtained by the method of the foregoing embodiment. The method comprises the following steps:

Step S31: taking a picture to a display image to obtain a picture.

Step S32: applying the Fourier transform to tristimulus values of the picture to obtain a frequency distribution function corresponding to each primary color.

Step S33: respectively applying convolution to the frequency distribution function corresponding to each primary color with a contrast sensitivity function of human eye in the frequency domain to obtain three convolution functions.

Wherein, the steps S3, S32 and S33 can refer to the related steps of the foregoing embodiment, it does not repeat here.

Step S34: respectively normalizing to each of the convolution functions for obtaining an evaluation parameter of each primary color.

Wherein, step S34 specifically include: proceeding center translation of an origin of each convolution function, calculating an absolute value of each convolution function at the origin, calculating a sum of the absolute values of the function of all variables of the frequency distribution function corresponding to each convolution function, and calculating the ratio of the absolute value of the function to the sum of the absolute values of the function.

Step S35: judging if the evaluation parameter of each primary color is greater than the evaluation standard parameter of corresponding primary color, wherein if one of the evaluation parameter of each primary color is greater than the evaluation standard parameter of the corresponding primary, color, determining that the quality of the image is failed.

Wherein, it uses the evaluation standard parameters of the standard picture as the base to compare the evaluation parameter of the red primary color of a picture with the evaluation standard parameter of the red primary color, the evaluation parameter of the green primary color of the picture with the evaluation standard parameter of the green primary color, and the evaluation parameter of the blue primary color of the picture with the evaluation standard parameter of the blue primary color. And if any one of the evaluation parameter of the primary color is greater than the evaluation standard parameter of the same primary color, it shows that the severity degree of the color shift, phenomenon is significant and determines that the quality of the image is fail.

By the above-described method, the method for establishing the evaluation standard parameters of the present invention and method for evaluating the quality of the display image through the establishment of the evaluation standard parameters. Then, processing evaluation by comparing evaluation parameters of arbitrary images with the evaluation standard parameters such that the evaluation process is more objective to reduce participation of the human eye in the evaluation process and to contribute to the design and development of the display system.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A method for establishing evaluation standard parameters, the evaluation standard parameters for evaluating the quality of a display image, the quality of the image being inversely proportional to the severity degree of the color shift phenomenon of the image, the method comprising:

taking pictures to a group of test images having different color shift severity degrees to obtain a sample picture group, and selecting a standard picture from the sample picture group by human eye;

applying the Fourier transform to tristimulus values of pictures of the sample picture group to obtain a frequency distribution function corresponding to each primary color, wherein the frequency distribution function corresponding to each primary color is respectively expressed as:

$$F(\omega_x) = F[X] = \int_{-\infty}^{\infty} X e^{-i\omega\lambda} d\lambda$$

$$F(\omega_y) = F[Y] = \int_{-\infty}^{\infty} Y e^{-i\omega\lambda} d\lambda$$

$$F(\omega_z) = F[Z] = \int_{-\infty}^{\infty} Z e^{-i\omega\lambda} d\lambda$$

$$X = \mu \int_a^b \phi(\lambda) \bar{x}(\lambda) d\lambda$$

$$Y = \mu \int_a^b \phi(\lambda) \bar{y}(\lambda) d\lambda$$

$$Z = \mu \int_a^b \phi(\lambda) \bar{z}(\lambda) d\lambda$$

wherein F ($\omega_x$), F ($\omega_y$), and F ($\omega_z$) are respectively the frequency distribution functions corresponding to the red primary color, the green primary colors, and the blue primary color; F is an operator of the Fourier transform; X, Y, and Z, represent the tristimulus values of the red, green, and blue primary colors; $\lambda$ is the wavelength; $\bar{x}(\lambda)$, $\bar{y}(\lambda)$, and $\bar{z}(\lambda)$ are spectral tristimulus values for the standard colorimetric observer; $\phi(\lambda)$ the reflectance of spectrum of a picture; (a, b) for the visible spectral range; $\mu$ is a scale factor;

respectively filtering the frequency distribution function corresponding to each primary color to filter the noise;

respectively applying convolution to the frequency distribution function corresponding to each primary color with a contrast sensitivity function of human eye in the frequency domain to obtain three convolution functions, the contrast sensitivity function of human eye is expressed as:

$$CSF(\omega)=2.6\times(0.0192+0.114\times\omega)\times e^{(-0.114\times\omega)^{1.1}};$$

the three convolution functions are expressed as:

$$H(\omega_x)=\int_{-\infty}^{\infty}F(\omega_x)CSF(k-\omega)d\omega$$

$$H(\omega_y)=\int_{-\infty}^{\infty}F(\omega_y)CSF(k-\omega)d\omega$$

$$H(\omega_z)=\int_{-\infty}^{\infty}F(\omega_z)CSF(k-\omega)d\omega$$

wherein, $CSF(\omega)$ is the contrast sensitivity function of human eye; $\omega=\sqrt{\omega_x^2+\omega_y^2}$ is the spatial frequency and its unit is cycle / degree; $\omega_x$ and $\omega_y$ are the horizontal direction and the vertical direction spatial frequency; $H(\omega_x)$, $H(\omega_y)$, and $H(\omega_z)$ are the three convolution functions; k is an offset value; the integral range is $-\infty$: $\infty$;

respectively normalizing to each of the convolution functions for obtaining an evaluation parameter of each primary color, the evaluation parameter of each primary color is expressed as:

$$Factor_X = \frac{H(\omega_X)}{F(\omega_X)}$$

$$Factor_Y = \frac{H(\omega_Y)}{F(\omega_Y)}$$

$$Factor_Z = \frac{H(\omega_Z)}{F(\omega_Z)}$$

wherein, $Factor_x$, $Factor_y$, and $Factor_z$ are the evaluation parameters; and wherein, the step of respectively normalizing to each of the convolution functions specifically includes: proceeding a center translation of an origin of each convolution function; calculating an absolute value of each convolution function at the origin; calculating a sum of the absolute values of the frequency distribution function corresponding to each convolution function; and calculating a ratio of the absolute value of each convolution function at the origin to the sum of the absolute values of the frequency distribution function corresponding to each convolution function; and selecting the evaluation parameters of the three primary colors of the standard picture from the sample picture group as the evaluation standard parameters.

2. The method according to claim 1, wherein, before calculating the ratio of the absolute value of the each convolution function at the origin to the sum of the absolute values of the frequency distribution function corresponding to each convolution function, excluding the absolute value of the frequency distribution function at the origin corresponding to each primary color in the sum of the absolute values of the frequency distribution function corresponding to each convolution function.

3. A method for establishing evaluation standard parameters, the evaluation standard parameters for evaluating the quality of a display image, the quality of the image being inversely proportional to the severity degree of the color shift phenomenon of the image, the method comprising:

taking pictures to a group of test images having different color shift severity degrees to obtain a sample picture group, and selecting a standard picture from the sample picture group by human eye;

applying the Fourier transform to tristimulus values of pictures of the sample picture group to obtain a frequency distribution function corresponding to each primary color;

respectively applying convolution to the frequency distribution function corresponding to each primary color with a contrast sensitivity function of human eye in the frequency domain to obtain three convolution functions;

respectively normalizing to each of the convolution functions for obtaining a evaluation parameter of each primary color;

wherein the step of respectively normalizing to each of the convolution functions specifically includes: proceeding a center translation of an origin of each convolution function; calculating an absolute value of each convolution function at the origin; calculating a sum of the absolute values of the frequency distribution function corresponding to each convolution function; and calculating a ratio of the absolute value of each convolution function at the origin to the sum of the absolute values of the frequency distribution function corresponding to each convolution function; and selecting the evaluation parameters of the three primary colors of the standard picture from the sample picture group as the evaluation standard parameters.

4. The method according to claim 3, wherein, before the step of respectively applying convolution to the frequency distribution function corresponding to each primary color with a contrast sensitivity function of human eye in the frequency domain, respectively filtering the frequency distribution function corresponding to each primary color to filter the noise.

5. The method according to claim 3, wherein, the frequency distribution function corresponding to each primary color is respectively expressed as:

$$F(\omega_x)=F\ [X]=\int_{-\infty}^{\infty}Xe^{-i\phi\lambda}d\lambda$$

$$F(\omega_y)=F\ [Y]=\int_{-\infty}^{\infty}Ye^{-i\phi\lambda}d\lambda$$

$$F(\omega_z)=F\ [Z]=\int_{-\infty}^{\infty}Ze^{-i\phi\lambda}d\lambda$$

$$X=\mu\int_a^b \phi(\lambda)\bar{x}(\lambda)d\lambda$$

$$Y=\mu\int_a^b \phi(\lambda)\bar{y}(\lambda)d\lambda$$

$$Z=\mu\int_a^b \phi(\lambda)\bar{z}(\lambda)d\lambda$$

wherein, $F(\omega_x)$, $F(\omega_y)$, and $F(\omega_z)$ are respectively the frequency distribution functions corresponding to the red primary color, the green primary colors, and the blue primary color; F is an operator of the Fourier transform; X, Y, and Z, represent the tristimulus values of the red, green, and blue primary colors; $\lambda$ is the wavelength; $\bar{x}(\lambda)$, $\bar{y}(\lambda)$, and $\bar{z}(\lambda)$ are spectral tristimulus values for the standard colorimetric observer; $\phi(\lambda)$ the reflectance of spectrum of a picture; (a, b) for the visible spectral range; $\mu$ is a scale factor.

6. The method according to claim 5, wherein, the contrast sensitivity function of human eye is expressed as:

$$CSF(\omega)=2.6\times(0.0192+0.114\times\omega)\times e^{(-0.114\times 107)^{1.1}}$$

wherein, $CSF(\omega)$ is the contrast sensitivity function of human eye; $\omega=\sqrt{\omega_x^2+\omega_y^2}$ is the spatial frequency and its unit is cycle / degree; $\omega_x$ and $\omega_y$ are the horizontal direction and the vertical direction spatial frequency.

7. The method according to claim 6, wherein, the three convolution functions are expressed as:

$$H(\omega_x) = \int_{-\infty}^{\infty} F(\omega_x) CSF(k-\omega) d\omega$$

$$H(\omega_y) = \int_{-\infty}^{\infty} F(\omega_y) CSF(k-\omega) d\omega$$

$$H(\omega_z) = \int_{-\infty}^{\infty} F(\omega_z) CSF(k-\omega) d\omega$$

wherein, $H(\omega_x)$, $H(\omega_y)$, and $H(\omega_z)$ are the three convolution functions; k is an offset value; the integral range is $-\infty$: $\infty$.

8. The method according to claim 3, wherein, before calculating the ratio of the absolute value of the each convolution function at the origin to the sum of the absolute values of the frequency distribution function corresponding to each convolution function, excluding the absolute value of the frequency distribution function at the origin corresponding to each primary color in the sum of the absolute values of the frequency distribution function corresponding to each convolution function.

9. The method according to claim 3, wherein, the evaluation parameter of each primary color is expressed as:

$$Factor_X = \frac{H(\omega_X)}{F(\omega_X)}$$

$$Factor_Y = \frac{H(\omega_Y)}{F(\omega_Y)}$$

$$Factor_Z = \frac{H(\omega_Z)}{F(\omega_Z)}$$

wherein, $Factor_x$, $Factor_y$, and $Factor_y$ are the evaluation parameters.

10. A method for evaluating the quality of a display image, wherein, the method uses the evaluation standard parameters as claimed in claim 3, the method comprising:

taking a picture to the display image to obtain a picture;

applying the Fourier transform to tristimulus values of the picture to obtain a frequency distribution function corresponding to each primary color;

respectively applying convolution to the frequency distribution function corresponding to each primary color with a contrast sensitivity function of human eye in the frequency domain to obtain three convolution functions;

respectively normalizing to each of the convolution functions for obtaining a evaluation parameter of each primary color;

wherein the step of respectively normalizing to each of the convolution functions specifically includes: proceeding a center translation of an on sin of each convolution function; calculating an absolute value of each convolution function at the origin; calculating a sum of the absolute values of the frequency distribution function corresponding to each convolution function; and calculating a ratio of the absolute value of each convolution function at the origin to the sum of the absolute values of the frequency distribution function corresponding to each convolution function; and judging if the evaluation parameter of each primary color is greater than the evaluation standard parameter of corresponding primary color, wherein if one of the evaluation parameter of each primary color is greater than the evaluation standard parameter of the corresponding primary color, determining that the quality of the image is failed.

* * * * *